US009246216B2

(12) United States Patent
Harel et al.

(10) Patent No.: US 9,246,216 B2
(45) Date of Patent: *Jan. 26, 2016

(54) SYSTEM AND METHOD FOR ADAPTIVE BEAM FORMING FOR SPECIFIC ABSORPTION RATE CONTROL

(71) Applicant: GOOGLE INC., Mountain View, CA (US)

(72) Inventors: Haim Harel, New York, NY (US); Kenneth Kludt, San Jose, CA (US); Phil F. Chen, Denville, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/098,674

(22) Filed: Dec. 6, 2013

(65) Prior Publication Data

US 2014/0091968 A1 Apr. 3, 2014

Related U.S. Application Data

(63) Continuation of application No. 13/889,918, filed on May 8, 2013, now Pat. No. 8,630,596, which is a continuation of application No. 12/876,977, filed on Sep. 7, 2010, now Pat. No. 8,442,457.

(60) Provisional application No. 61/240,459, filed on Sep. 8, 2009.

(51) Int. Cl.
*H04B 7/02* (2006.01)
*H04B 1/04* (2006.01)
(Continued)

(52) U.S. Cl.
CPC ............... *H01Q 3/00* (2013.01); *H01Q 3/2605* (2013.01); *H04B 1/3838* (2013.01); *H04B 7/0404* (2013.01); *H04B 7/0617* (2013.01); *H04B 7/0689* (2013.01); *H04B 17/103* (2015.01)

(58) Field of Classification Search
USPC .......... 455/63.4, 562.1, 575.7, 103, 117, 126, 455/101, 129, 115.1, 115.3; 342/360, 368
See application file for complete search history.

(56) References Cited

U.S. PATENT DOCUMENTS 5,642,353 A 6/1997 Roy et al.
5,832,044 A 11/1998 Sousa et al.
(Continued)

FOREIGN PATENT DOCUMENTS

EP 0986193 3/2000
EP 1282242 A1 2/2003
(Continued)

OTHER PUBLICATIONS

Derryberry et al., "Transmit Diversity in 3G COMA Systems", Wideband Wireless Access Technologies to Broadband Internet, IEEE Communications Magazine, Apr. 2002, pp. 68-75.
(Continued)

*Primary Examiner* — Ngyuen Vo
(74) *Attorney, Agent, or Firm* — Troutman Sanders LLP; Scott D. Barnett; James E. Schutz

(57) ABSTRACT

A system may include a modifiable mobile device having at least two antennas coupled to fractional amplifiers, with returned power detectors. A beamformer unit provides adaptive beam shaping pattern, and a baseband processor provides beam pattern requirements, wherein the beamformer unit modifies the beam pattern requirements with return loss sampling information to shape the adaptive beam pattern so that a transmitted beam pattern minimizes transmitted power reflected back to the mobile device. A method may include regularly measuring a return power level, if output power is greater than a specific absorption rate level, comparing the return power level to a first threshold, else implementing mobile transmit diversity (MTD), and repeating. If the return power level is greater than the first threshold, implementing a MTD combined with reflection-based beamforming that modifies beam pattern requirements of the mobile device with return loss sampling information to create an adaptive beam pattern.

14 Claims, 7 Drawing Sheets

(51) Int. Cl.
*H01Q 11/12* (2006.01)
*H01Q 3/00* (2006.01)
*H04B 7/04* (2006.01)
*H04B 7/06* (2006.01)
*H01Q 3/26* (2006.01)
*H04B 17/10* (2015.01)
*H04B 1/3827* (2015.01)

(56) References Cited

U.S. PATENT DOCUMENTS

| | | | |
|---|---|---|---|
| 5,991,330 | A | 11/1999 | Dahlman et al. |
| 5,999,826 | A | 12/1999 | Whinnett et al. |
| 6,185,440 | B1 | 2/2001 | Barratt et al. |
| 6,226,509 | B1 | 5/2001 | Mole et al. |
| 6,236,363 | B1 | 5/2001 | Robbins et al. |
| 6,330,294 | B1 | 12/2001 | Ansbro et al. |
| 6,343,218 | B1 | 1/2002 | Kaneda et al. |
| 6,392,988 | B1 | 5/2002 | Allpress et al. |
| 6,492,942 | B1 | 12/2002 | Kezys |
| 6,636,495 | B1 | 10/2003 | Tangemann |
| 6,704,370 | B1 | 3/2004 | Chheda et al. |
| 6,745,009 | B2 | 6/2004 | Raghothaman |
| 6,810,264 | B1 | 10/2004 | Park et al. |
| 6,859,643 | B1 | 2/2005 | Ma |
| 6,882,228 | B2 | 4/2005 | Rofougaran |
| 7,551,890 | B2 | 6/2009 | Fenk et al. |
| 8,442,457 | B2 * | 5/2013 | Harel et al. ............ 455/101 |
| 2003/0112880 | A1 | 6/2003 | Walton et al. |
| 2004/0048584 | A1 | 3/2004 | Vaidyanathan et al. |
| 2004/0085239 | A1 | 5/2004 | Ukena et al. |
| 2005/0059355 | A1 | 3/2005 | Liu |
| 2005/0093624 | A1 * | 5/2005 | Forrester et al. ............ 330/129 |
| 2005/0143113 | A1 | 6/2005 | Lee et al. |
| 2007/0237256 | A1 | 10/2007 | Boos |
| 2009/0047998 | A1 | 2/2009 | Alberth, Jr. |

FOREIGN PATENT DOCUMENTS

| | | |
|---|---|---|
| EP | 1282244 A1 | 2/2003 |
| EP | 1284545 A1 | 2/2003 |
| EP | 1262031 A1 | 5/2004 |
| EP | 1262031 B1 | 5/2004 |
| EP | 1284545 B1 | 7/2008 |
| GB | 2353437 A | 2/2001 |
| JP | 09-238098 | 9/1997 |
| JP | 2000151484 A | 5/2000 |
| WO | 97/24818 | 7/1997 |
| WO | 00/79701 | 12/2000 |
| WO | 01/69814 | 9/2001 |
| WO | 03/090386 | 10/2003 |
| WO | 2004/045108 | 5/2004 |
| WO | 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

* cited by examiner

SYSTEM AND METHOD FOR ADAPTIVE BEAM FORMING FOR SPECIFIC ABSORPTION RATE CONTROL

CLAIM OF PRIORITY

This application is a continuation of U.S. patent application Ser. No. 13/889,918 filed May 8, 2013, now allowed, which is a continuation of U.S. patent application Ser. No. 12/876,977 filed Sep. 7, 2010, now U.S. Pat. No. 8,442,457 which claims the benefit of priority, under 35 U.S.C. §119, of U.S. Provisional Application No. 61/240,459, filed Sep. 8, 2009, titled "Adaptive SAR Control With Beam Forming," the contents of which are incorporated herein by reference in their entirety.

FIELD OF THE INVENTION

The present invention relates to specific absorption rate for a mobile device and, in particular, to a system and method for specific absorption rate control using beamforming.

BACKGROUND

Specific absorption rate (SAR) is an indication of the amount of radiation absorbed by a user of a mobile device. Absorption levels may be typically defined and measured by placing a liquid-filled phantom head, hand, or other emulated body part close to the edge(s) of a mobile device while transmitting. Measurements of a rise in the liquid's temperature provide an indication of the radiation exposure.

Meeting SAR requirements for mobile phones may be addressed by radiation pattern shaping, which is facilitated by the fixed orientation relationship between the mobile phone's handset and the user's head (i.e., next to the ear). However, there are mobile devices that experience variable orientation relationships with the human body, for example cellular modems. A cellular modem may be packaged as a dongle and can be inserted into a portable computer at many different orientations based on the configuration of the portable computer's ports—typically there may be a minimum of four orientations.

To meet SAR requirements, dongles may be designed so as not to exceed predefined SAR limitations in all of its possible orientations. Because mobile antenna patterns may be hard to control, the conventional approach may be to set the antenna radiation limits based on peak radiation points rather than peak radiated averages (i.e., total radiated power (TRP)). This conventional approach may cause vendors to limit the maximum power, the maximum data rate, and/or the minimal physical size of the dongle.

SUMMARY

In one embodiment, the invention may provide a system that may include a modifiable mobile communication device. The modifiable mobile communication device may have at least two antennas coupled to respective fractional power amplifiers, respective returned power detectors coupled to a transmission path between each of the at least two antennas and respective fractional power amplifiers, a beamformer unit configured to provide an adaptive beam shaping pattern to the fractional power amplifiers, the adaptive beam shaping pattern configured to shape a transmitted beam pattern to minimize an amount of transmitted power reflected back to at least one of the antennas, and a baseband processor configured to provide beam pattern requirements to the beamformer unit, wherein the respective returned power detectors provide return loss sampling information to the beamformer unit. The beamformer unit may be configured to modify the beam pattern requirements with the return loss sampling information to determine the adaptive beam shaping pattern.

In another embodiment, the invention may provide a method that may include a) measuring a return power level present at antennas of a modifiable mobile communication device at regular time intervals, b) if an output power of the modifiable mobile communication device is greater than a predefined specific absorption rate level, comparing the return power level to a first threshold, c) if an output power of the modifiable mobile communication device is less than or equal to a predefined specific absorption rate level, implementing mobile transmit diversity, and d) repeating steps a-c, e) if the return power level is greater than the first threshold, implementing a mobile transmit diversity algorithm combined with a reflection-based beamforming technique that provides an adaptive beam shaping pattern that shapes a transmitted beam pattern to minimize an amount of reflected transmitted power, f) re-measuring the return power level, g) if the return power level has increased, applying a change to a diversity parameter of the mobile transmit diversity algorithm based on the results of the evaluating step, h) if the return power level is less than a second threshold, repeating steps a-c, and i) if the return power level is equal to or greater than the second threshold, repeating steps e-g. The reflection-based beamforming technique includes the step of modifying a beam pattern requirement of the modifiable communication device with return loss sampling information to create an adaptive beam shaping pattern.

In another embodiment, the invention may provide a method that may include a) measuring a return power level present at antennas of a modifiable mobile communication device at regular time intervals, b) if an output power of the modifiable mobile communication device is greater than a predefined specific absorption rate level, comparing the return power level to a first threshold, c) if an output power of the modifiable mobile communication device is less than or equal to a predefined specific absorption rate level, implementing mobile transmit diversity, and d) repeating steps a-c, e) if the return power level is greater than the first threshold, implementing a mobile transmit diversity algorithm combined with reflection-based beamforming that provides an adaptive beam shaping pattern that shapes a transmitted beam pattern to minimize an amount of reflected transmitted power, f) re-measuring the return power level, g) if the return power level has increased, reducing the output power of the modifiable mobile communication device, h) if the return power level is less than a second threshold, repeating steps a-c, and i) if the return power level is equal to or greater than the second threshold, repeating steps e-g. The reflection-based beamforming technique includes the step of modifying a beam pattern requirement of the modifiable communication device with return loss sampling information to create an adaptive beam shaping pattern.

DETAILED DESCRIPTION

Figure 1:
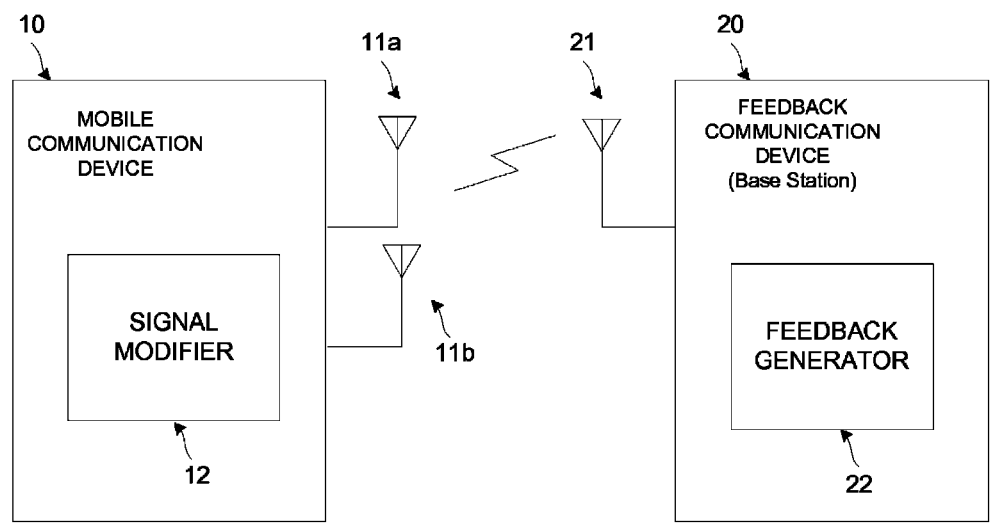
FIG. 1 illustrates a block diagram of a conventional communication network.

A system, method, and device in accordance with the invention may control transmitting power and directionality of a mobile device antenna so as to maximize effective radiated power (ERP) towards a desired direction while maintaining the radiation level below maximum limits that may be predefined by SAR requirements.

Beamforming may be used to manipulate antenna radiation patterns to, for instance, shape beam patterns to keep radiation peaks away from a user's body to reduce radiation exposure, thereby reducing the body's absorption of radiation. Beamforming techniques may be applied when the location of the absorption spots are not fixed in space with respect to the mobile device, but rather vary with the orientation of the mobile device (as an example, when the mobile device is stuck horizontally or vertically into a laptop port).

Adaptive beamforming to shape a radiation pattern clear of an absorption spot having a non-fixed orientation relative to the radiation source may be done using a sensing mechanism to identify the spatial orientation of the mobile device in real time. Systems and methods in accordance with an embodiment of the invention may incorporate a sensing mechanism that may use a change in the reflected power received by an antenna in the mobile device to identify absorption spots.

In one embodiment of the invention, a determination may be made to determine whether the radiation level at an identified absorption spot may be approaching predefined SAR limits. A procedure may implement transmit diversity techniques to reduce the amount of the radiated power directed toward these spots. A beamforming procedure may perform a reduction in the radiated directivity without compromising the average radiated power of the mobile device, and may maintain a maximum allowable ERP towards receiving stations of an electronic communication network connected to the mobile device.

Mobile devices that may use beamforming for signal-to-interference-plus-noise ratio (SINR) improvement and to create a shaped directional transmission pattern. While such functionality may be generally desirable to improve efficiency, user experience, battery life, etc., meeting SAR requirements may have an overriding importance that may need to be met under all conditions including when beamforming for SINR and other considerations.

Adaptive beamforming may be a signal processing technique that achieves spatial selectivity by using adaptive beam patterns. Adaptive beamforming may detect and estimate the signal-of-interest by, for example, data-adaptive spatial filtering and interference rejection. Beamforming may take advantage of interference to change the directionality of the array. When transmitting, a beamformer unit may control the phase and relative amplitude of the signal at each antenna element so as to create a pattern of constructive and destructive interference in the transmitted wave front.

Beam steering is different than beamforming. Beam steering may change the direction of the main lobe of a radiation pattern. Beam steering may be accomplished by switching antenna elements or by changing the relative phases of the RF signals driving the elements.

Return Loss Variation Detection

Perfectly matching the output impedance of an antenna to free space may be unobtainable. The antenna mismatch may cause some of the transmitted power to be reflected back to the power transmitter circuitry. This reflection phenomenon may intensify when the radiating antenna is placed close to an absorbing substance, for example a human body. Two adverse effects may happen: (i) the human body may absorb radiation; and (2) altering the antenna's impedance moves the antenna match from its design values and may cause an increase in the level of power reflected back to the transmitting circuitry.

A mobile device may include circuitry that may implement mobile transmit diversity (MTD), which may use two or more transmitting antennas. For example, U.S. Pat. No. 7,551,890 to Fenk et al., "Method for Reducing the Radiation Load by a Mobile Radio Terminal with Directional Emission, and a Mobile Radio Terminal with Directional Emission," describes reducing the power emission from a mobile station while maintaining transmission quality requirements by using an antenna with adjustable directional characteristics.

FIG. 1 illustrates a block diagram of a conventional communication network that may include a modifiable mobile communication device 10 having antennas 11a, 11b. The mobile communication device may transmit a signal, or series of signals that may be received by base station 20 via antenna 21. Within base station 20 may be feedback generator 22 that may evaluate the received signal from mobile communication device 10 and may provide a feedback signal containing information describing the received signal. Base station 20 may transmit the feedback signal for reception by mobile communication device 10. Signal modifier 12 within the mobile communication device may evaluate the received feedback signal and implement adjustments on the signal transmitted from the mobile communication device. Antenna selection, phase and/or power differences may change the direction of a main lobe transmitted from mobile communication device 10.

Figure 2:
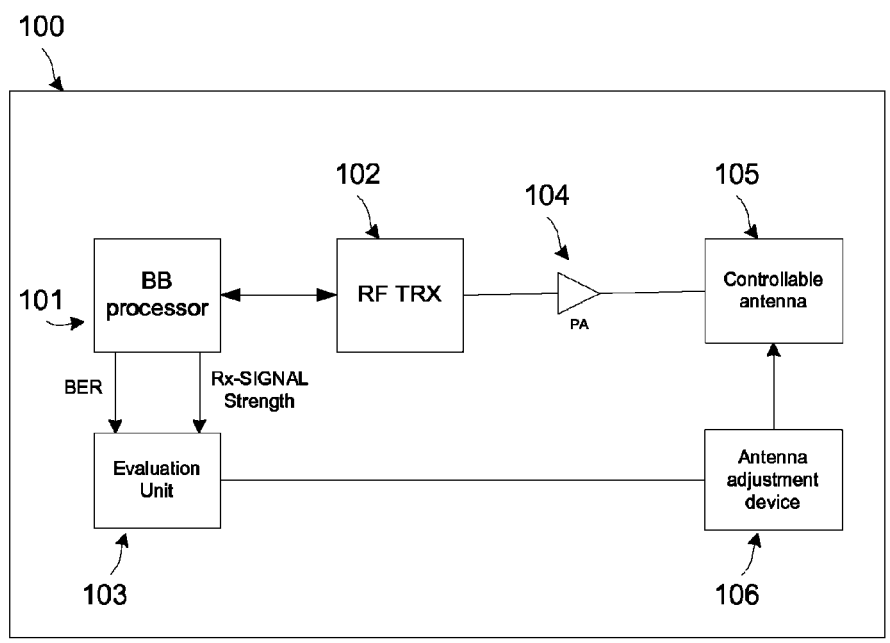
FIG. 2 illustrates a block diagram of a conventional mobile radio terminal.

FIG. 2 illustrates a block diagram of the transmit channel for a conventional mobile radio terminal that may reduce radiation by directional emission. Antenna 105 may have controllable directional characteristics. The antenna may be connected to power amplifier 104 (PA). The power amplifier may be connected to a radio-frequency transmitter 102. Baseband processor 101 (BB) may be connected to the RF transmitter. The BB processor may have outputs that include bit error rate and received signal field strength information and/or data. The bit error rate and the received field strength information may be input variables provided to evaluation unit 103. The output of evaluation unit 103 may be connected to antenna adjustment device 106. The antenna adjustment device may provide a control signal to a control input of controllable antenna 105. The evaluation unit 103 may make it possible to adjust the main lobe direction of antenna 105, via the antenna adjustment device, such that reception and transmission power signal qualities may be optimized.

A mobile device may include circuitry that may monitor the transmitted channel returned power level. For example, U.S. Pat. No. 7,702,032 to Boos, "Transmitter and Method of Transmitting a Signal," describes using a circulator coupled to the output of a transmitter and, for example, monitoring the transmitter output impedance and matching a power amplifier's impedance to a change in transmitter output impedance.

Figure 3:
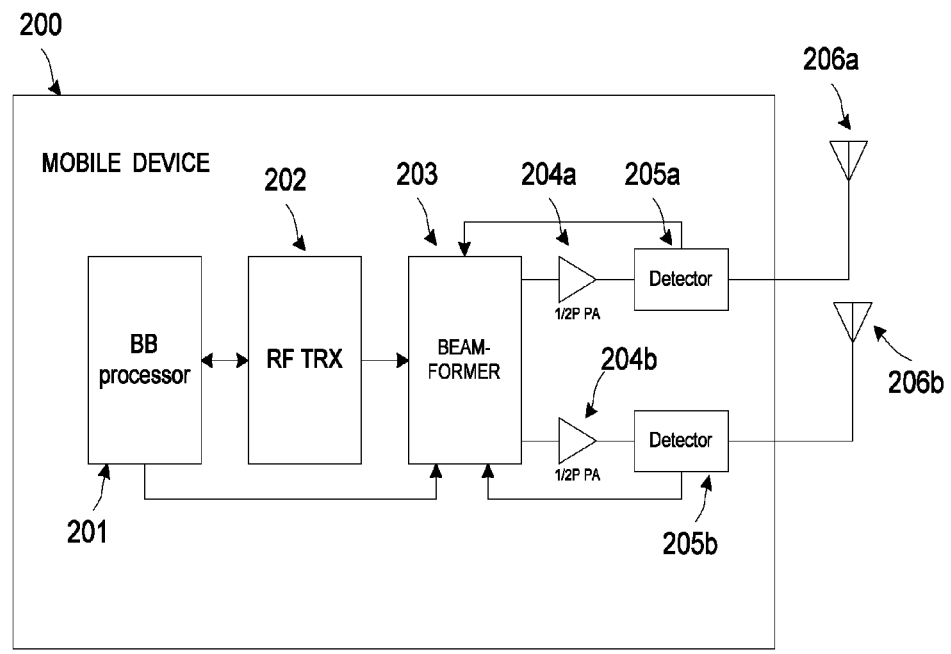
FIG. 3 illustrates a block diagram of a mobile communication device in accordance with an embodiment of the invention.

FIG. 3 illustrates a block diagram of mobile device 200 in accordance with an embodiment of the invention. Mobile device 200 may be a modifiable mobile communication device that can reduce SAR level exposure to a user by implementing reflection-based beamforming techniques that are in accordance with an embodiment of the invention. Mobile device 200 may include antennas 206a, 206b connected to respective fractional output power amplifiers 204a, 204b. Embodiments of the invention may have other quantities of antennas and power amplifiers.

Each antenna may be a single radiating element, or an array of radiating elements. The radiating elements may be, for example, a monopole, dipole, loop, patch, microstrip, dielectric, or other type of radiating element. The output power amplifiers each may be set to an equal power level (e.g., half transmitted power), or to unequal levels as may be determined by beamformer unit 203. Respective returned power detectors 205a, 205b are positioned between the output power amplifiers and the antennas. Although schematically represented as being in-line with fractional output amplifier 204a, 204b and antennas 206a, 206b, the detectors need only sample the RF present on the output channels by being coupled to a transmission path between the antenna and the fractional power amplifier. Detectors 205a, 205b may be, for example, circulators, diodes, crystals, or other solid state devices.

Detectors 205a, 205b may provide sampling information to beamformer unit 203. The sampling information may include amplitude and/or phase information of return loss signals present at one or more of antennas 206a, 206b. This sampling information may be an indication of the match of the antennas to the free space environment (e.g., scattering matrix, impedance mismatch, reflected return signal levels, etc.). This sampling information may be used in conjunction with beam pattern requirements that may be provided by baseband processor 201 to beamformer unit 203 to create a reflection-based beamforming pattern that may adaptively shape a transmitted beam pattern to minimize an amount of transmitted power reflected back to the radiating antenna when mobile device 200 is placed close to an absorbing substance, for example, a user's body. The adaptively-shaped beam pattern having reduced power levels, and/or nulls, in a direction of a user's body so as to reduce SAR levels in the user.

The baseband processor may provide control information to radio frequency transmitter 202 (RF TRX). The control information may include operating frequency, power level, and modulated signal information for transmission. RF transmitter 202 may provide modulated RF signals to one or more input channels of beamformer unit 203, which may be disposed between the RF transmitter and the fractional power amplifiers.

Figure 4:
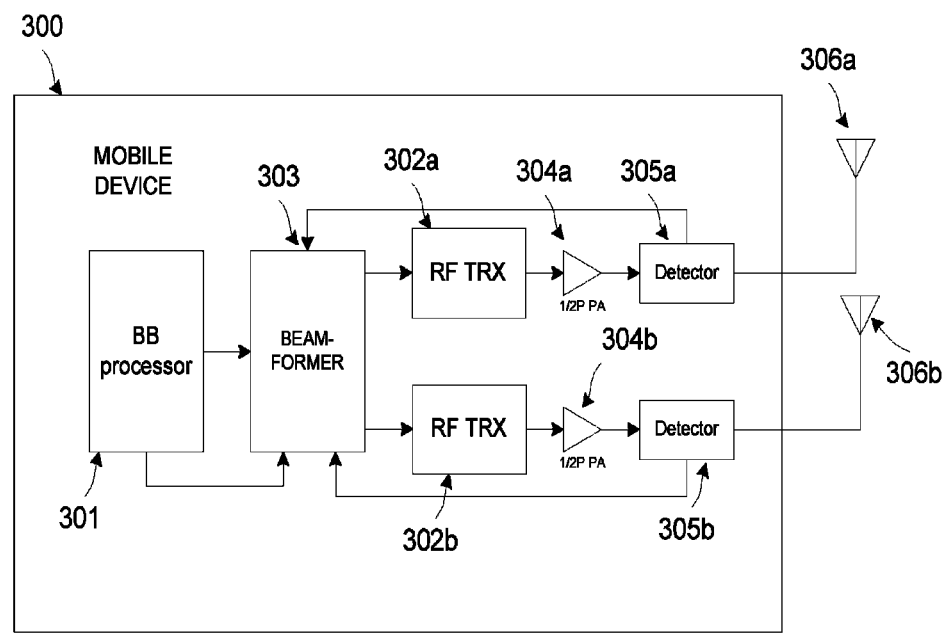
FIG. 4 illustrates a block diagram of a mobile communication device in accordance with an embodiment of the invention.

FIG. 4 illustrates a block diagram of mobile device 300 in accordance with an embodiment of the invention. Mobile device 300 may be a modifiable mobile communication device that can reduce SAR levels in a user by implementing reflection-based beamforming techniques that are in accordance with an embodiment of the invention. Mobile device 300 may be a modifiable mobile communication device that can reduce SAR levels exposure to a user by implementing reflection-based beamforming techniques that are in accordance with an embodiment of the invention.

Mobile device 300 may include antennas 306a, 306b connected to respective fractional output power amplifiers 304a, 304b. Embodiments of the invention may have other quantities of antennas and power amplifiers.

Each antenna may be a single radiating element, or an array of radiating elements. The radiating elements may be, for example, a monopole, dipole, loop, patch, microstrip, dielectric, or other type of radiating element. The output power amplifiers each may be set to an equal power level (e.g., half transmitted power), or to unequal levels as may be determined by beamformer unit 303. Respective returned power detectors 305a, 305b are positioned between the output power amplifiers and the antennas. Although schematically represented as being in-line with fractional output amplifier 304a, 304b and antennas 306a, 306b, the detectors need only sample the RF present on the output channels by being coupled to a transmission path between the antenna and the fractional power amplifier. Detectors 305a, 305b may be, for example, circulators, diodes, crystals, or other solid state devices.

Detectors 305a, 305b may provide sampling information to beamformer unit 303. The sampling information may include amplitude and/or phase information of return loss signals present at one or more of antennas 306a, 306b. This sampling information may be an indication of the match of the antennas to the free space environment (e.g., scattering matrix, impedance mismatch, reflected return signal levels, etc.). This sampling information may be used in conjunction with beam pattern requirements that may be provided by baseband processor 301 to beamformer unit 303 to create a reflection-based beamforming pattern that may adaptively shape a transmitted beam pattern to minimize an amount of transmitted power reflected back to the radiating antenna when mobile device 300 is placed close to an absorbing substance, for example, a user's body. The baseband processor may provide control information to beamformer unit 303. The control information may include operating frequency, power level, and modulated signal information for transmission.

Beamformer unit 303 may be coupled to the BB processor and disposed between the BB processor and respective RF transmitters 302a, 302b. A RF output from the reflection-based beamformer may be provided to respective RF output channels coupled to respective RF transmitters 302a, 302b.

A reflection-based beamformer in accordance with an embodiment of the invention may be implemented as a processor, a field programmable gate array, integrated within the BB processor, or implemented as one or more software modules stored in a nonvolatile memory accessible by a processor, for example the BB processor.

Mobile devices 200, 300 may facilitate the measurement of normative and excessive returned power levels, where excessive returned power levels may be above SAR recommended levels. The excessive returned power levels may be from a mismatch between the antenna(s) and their immediate environment, which may indicate the presence of a user's body.

Mobile devices 200, 300 may be used to implement MTD by, for example beamforming and/or antenna selection, using at least two antennas, and feeding each antenna from a fractional (for instance half-power) power amplifier.

Figure 5:
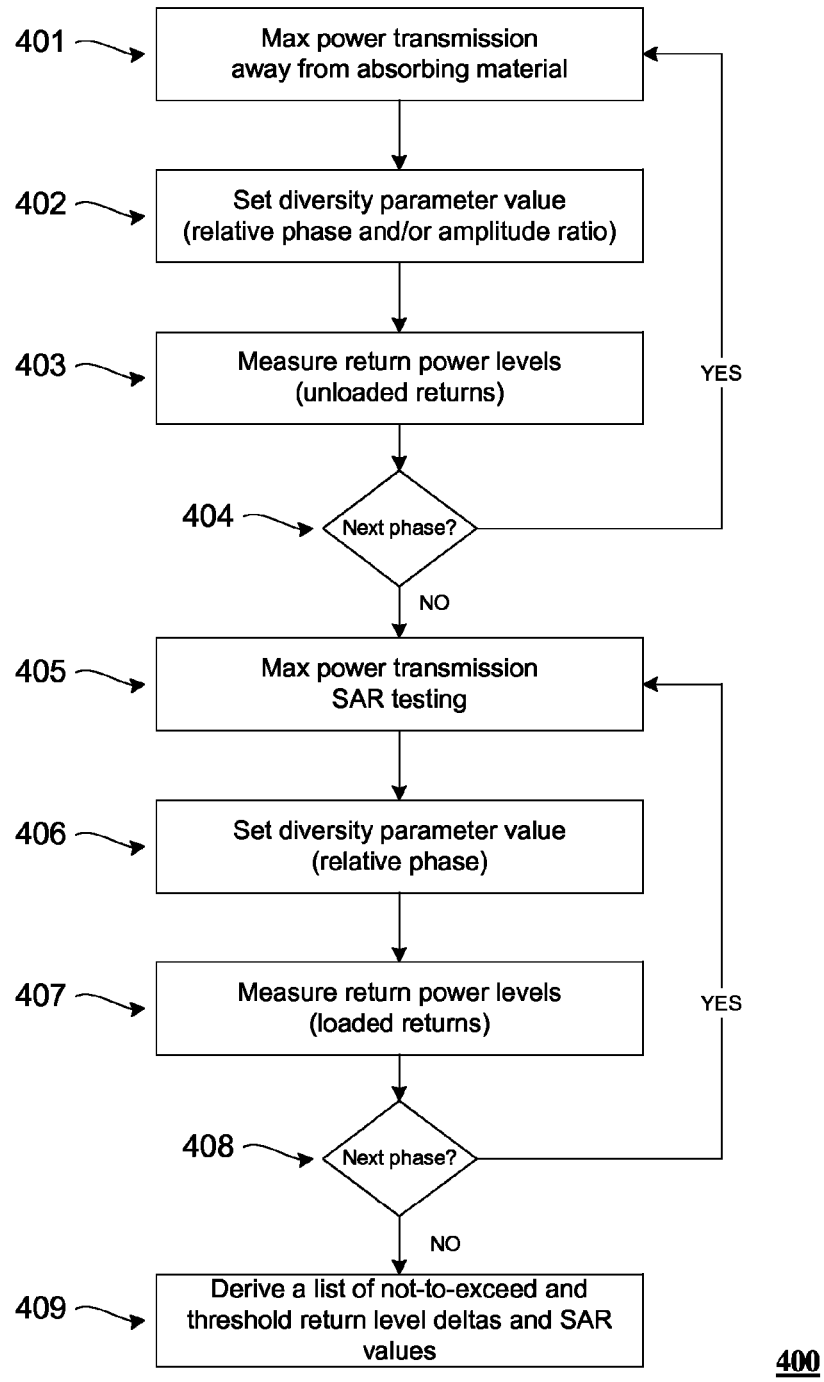
FIG. 5 illustrates a flow diagram for a method in accordance with an embodiment of the invention.

FIG. 5 illustrates Process 400 in accordance with an embodiment of the invention. Process 400 may be a method for obtaining calibration points of returned power levels and thresholds that may be used by a reflection-based beamformer in accordance with an embodiment of the invention. The process may first transmit a signal from a mobile communication device with a predetermined diversity parameter value, and measure an unloaded return loss value. Measurements may be repeated for other diversity parameter values to obtain a set of unloaded return values. The measurements may then be repeated for the same diversity parameter values to obtain loaded return loss measurements. While operating two or more antennas, a calibration procedure may be as follows.

Operating at a transmitting power level, for example maximum output power, step 401, set a diversity parameter value, step 402 (e.g., relative phase and/or power weighting). Measure an unloaded return loss at each antenna, step 403. At step 404 a decision may be made as to whether there are additional parameter values (e.g., phase), if there are additional values Process 400 may return to step 401. If all diversity parameter values have been measured, Process 400 may continue to step 405.

The mobile device may be subject to SAR testing, by performing steps 405-408, which correspond to steps 401-404 except under loaded conditions—i.e., where the antenna is located near an absorbing body. Steps 405-408 may be repeated for each of the diversity parameter values and may be repeated for all possible orientations of the mobile communication device with respect to the absorbing body. For example, as described above there may be four orientations for a cellular modem packaged as a dongle.

Steps 401-408 may be repeated under a sufficient number of cases to obtain adequate resolution of data points.

The returned power levels of unloaded and loaded returns may be compared to generate a deviation table of returned power level deltas and/or calculated VSWR values (using known forward power levels and the measured return power levels) that are correlated with the SAR measurements.

A list of not-to-exceed and threshold return level deltas may be derived, step 409, by recording SAR values and returned power levels (loaded returns) under these conditions. The deltas of not-to-exceed return power level deltas (dB, dBm, or mW) and/or VSWRs versus diversity parameter values may be presented in a table or list. These data points may indicate when not-to-exceed SAR levels are being approached, and may be used to determine where to set thresholds for activating or deactivating correction mechanisms such as reflection-based beamforming and/or transmit power reduction so as to assure operation of a mobile communication device within predefined SAR levels. The reflection-based beamforming may provide an adaptive beam shaping pattern that may shape a transmitted beam pattern to minimize an amount of reflected transmitted power.

Table 1 illustrates a sample table derived from the data points obtained by Process 400 for phase. A table may also be obtained from data points for amplitude and other diversity parameter values.

TABLE I

Sample Exceeding SAR Calibration

| Frequency (MHz) | Diversity Parameter value (Relative Phase in degrees) | Return Loss in free space (dB) | Return Loss in SAR testing (dB) | Exceeding SAR (dB) |
|---|---|---|---|---|
| 1852.4 | 36 | 10 | 8 | 1.1 |
| 1852.4 | 48 | 10 | 11 | 0.5 |
| 1852.4 | 60 | 10.5 | 13 | 1.3 |
| 1852.4 | 72 | 11 | 9.6 | 0.7 |

Beamforming and Returned Power Correction

Figure 6:
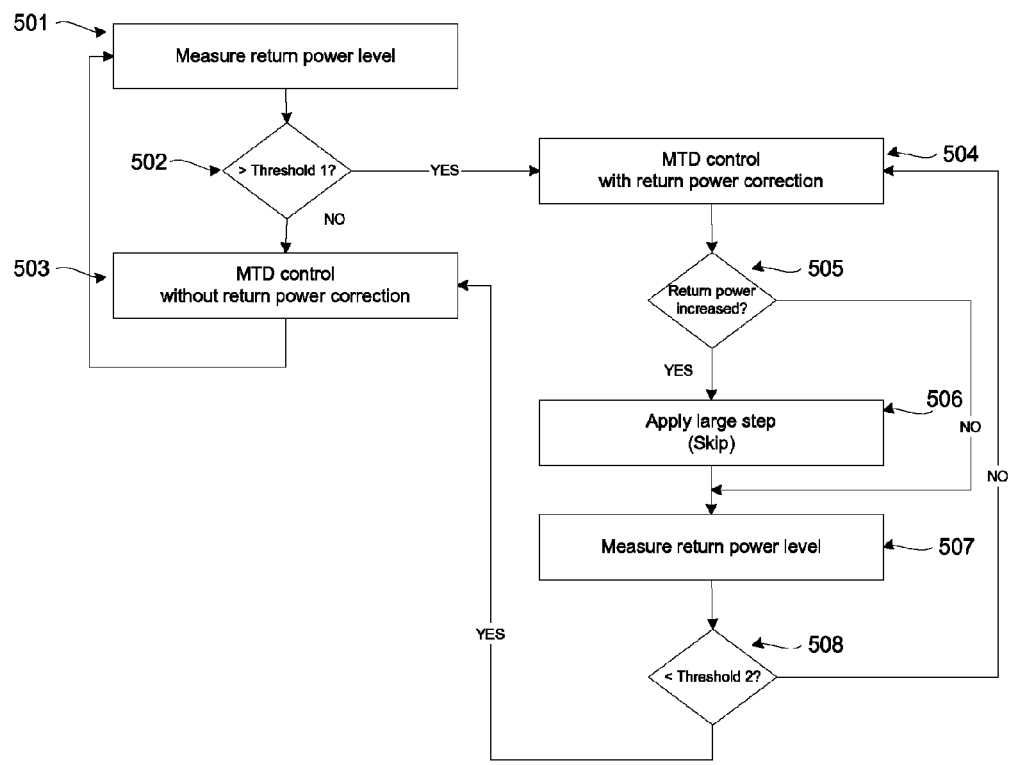
FIG. 6 illustrates a flow diagram for a method in accordance with an embodiment of the invention.

FIG. 6 illustrates Process 500 in accordance with an embodiment of the invention. Process 500 may be a method for return power correction and reducing SAR levels that may be implemented by a reflection-based beamformer in accordance with an embodiment of the invention.

During operation of a mobile device, Process 500 may regularly measure the return power level, step 501. The regularity of these measurements may be done constantly, periodically, continually, or at another time interval. Monitoring of the return power loss measurements may be done to determine when to trigger a return power correction mechanism. If an output power of a mobile device is greater than the SAR level (maximum output power exceeds SAR) and a returned power delta is not greater than threshold 1, step 502, a MTD technique without a reflection-based beamforming technique may be implemented, step 503. Where threshold 1 is a function of the operating frequency and diversity value, and may be equal to a loaded return loss (SAR testing) minus an unloaded return loss (free space) plus a back-off margin (dB). Process 500 may obtain threshold 1 from reading an entry in a lookup table stored in memory, where the lookup table may have the information described with reference to Table 1, above. After implementing the MTD technique without a reflection-based beamforming technique, Process 500 returns to measuring the return power level, step 501. The reflection-based beamforming technique may provide an adaptive beam shaping pattern that may shape a transmitted beam pattern to minimize an amount of reflected transmitted power.

If threshold 1 is exceeded, step 502, a MTD technique with a reflection-based beamforming technique may be implemented, step 504. After the MTD with reflection-based beamforming is implemented, the return power is measured, step 505, to determine if there has been an increase in return power compared to the measurements made previously.

If the return power has increased, an unfavorable result, Process 500 continues at step 506, where a large step or skip in the diversity parameter is applied to the output signal by the MTD control. With return power correction, if gradient-seeking algorithms in MTD control increases returned power, those phases exceeding SAR at maximum power (large step) may be skipped.

If the return power has not increased, Process 500 continues at step 507 where the return power level is measured. In some embodiments the return power level may not need to be measured at step 507 if the value obtained at step 505 is available for use by Process 500 and step 506 was not performed.

The returned power level is compared to threshold 2, step 508. Where threshold 2 may be, for example, half of threshold 1. Process 500 may also use other values for threshold 2, for example threshold 2 may be at a minimum 0.5 dB, or threshold 1 minus 0.5 dB.

If the returned power level is determined at step 508 to be less than threshold 2, then Process 500 continues at step 503, where the return power correction from step 504 may be turned off. If the returned power level is determined to be equal or greater than threshold 2, then Process 500 continues at step 504 where further reflection-based beamforming techniques may be implemented.

Figure 7:
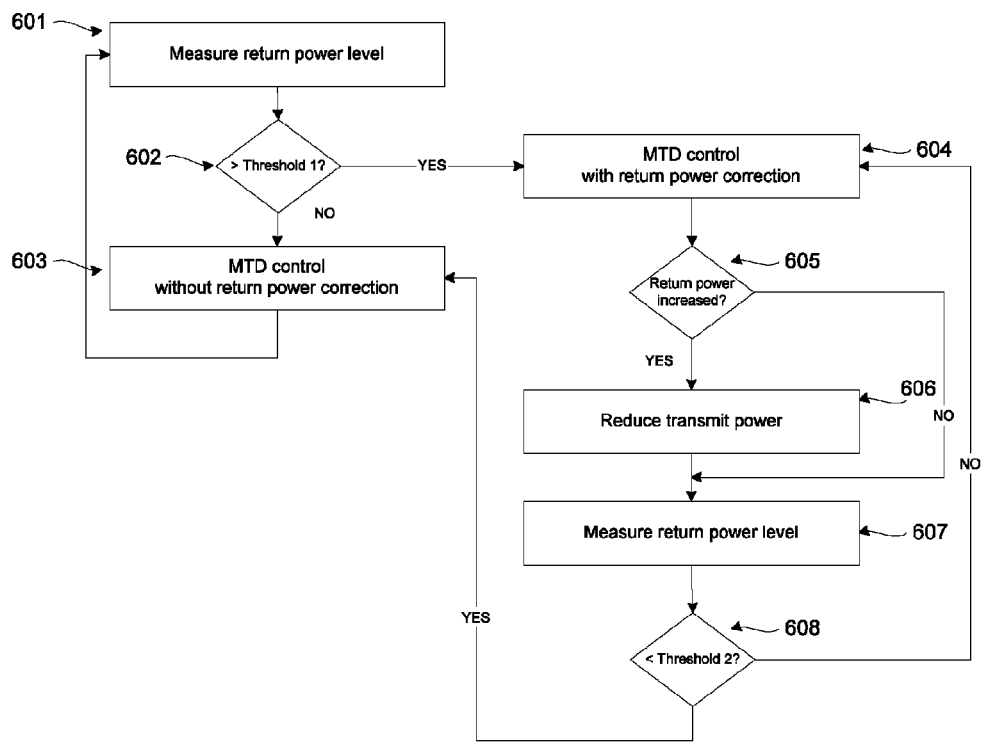
FIG. 7 illustrates a flow diagram for a method in accordance with an embodiment of the invention.

FIG. 7 illustrates Process 600 in accordance with an embodiment of the invention. Process 600 may be a method for return power correction and reducing SAR levels that may be implemented by a reflection-based beamformer in accordance with an embodiment of the invention.

During operation of a mobile device, Process 600 may regularly measure the return power level, step 601. The regularity of the measurements may be done constantly, periodically, continually, or at another time interval. Monitoring of the return power loss measurements may be done to determine when to trigger a return power correction mechanism. If an output power of a mobile device is greater than the SAR level (maximum output power exceeds SAR) and a returned power delta is not greater than threshold 1, step 602, a MTD technique without a reflection-based beamforming technique may be implemented, step 603. Where threshold 1 is a function of frequency and diversity value, and may be equal to a loaded return loss (SAR testing) minus an unloaded return loss (free space) plus a back-off margin (dB). Process 600 may obtain threshold 1 from reading an entry in a lookup table stored in memory, where the lookup table may have the information described with reference to Table 1, above. After implementing the MTD technique without a reflection-based beamforming technique, Process 600 returns to measuring the return power level, step 601.

If threshold 1 is exceeded, step 602, a MTD technique with a reflection-based beamforming technique may be implemented, step 604. After the MTD with reflection-based beamforming is implemented, the return power is measured, step 605, to determine if there has been an increase in return power compared to the measurements made previously.

If the return power has increased, an unfavorable result, Process 600 continues at step 606, which reduces the transmit power.

If the return power has not increased, Process 600 continues at step 607 where the return power level is measured. In some embodiments the return power level may not need to be measured at step 607 if the value obtained at step 605 is available for use by Process 600 and step 606 was not performed.

The returned power level is compared to threshold 2, step 608. Where threshold 2 may be, for example, half of threshold 1. Process 600 may also use other values for threshold 2, for example threshold 2 may be at a minimum 0.5 dB, or threshold 1 minus 0.5 dB.

If the returned power level is determined at step 608 to be less than threshold 2, then Process 600 continues at step 603, where the return power correction from step 604 may be turned off. If the returned power level is determined to be equal or greater than threshold 2, then Process 600 continues at step 604 where further reflection-based beamforming techniques may be implemented. The reflection-based beamforming technique may provide an adaptive beam shaping pattern that may shape a transmitted beam pattern to minimize an amount of reflected transmitted power.

If phase continuity constraints are mandated for the mobile communication device's protocol, large steps in the MTD gradient-seeking algorithm can be turned into normal steps by reducing the maximum transmitted power by the amount of power exceeding SAR (dB) levels at a current frequency and diversity value.

While there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method comprising the steps of:
    a) measuring a return power level present at antennas of a modifiable mobile communication device at regular time intervals;
    b) determining that an output power of the modifiable mobile communication device is greater than a predefined specific absorption rate level, and comparing the return power level to a first threshold;
    c) determining that the return power level is greater than the first threshold, implementing a mobile transmit diversity algorithm combined with a reflection-based beamforming technique, the reflection-based beamforming technique providing an adaptive beam shaping pattern that shapes a transmitted beam pattern to minimize an amount of reflected transmitted power;
    d) re-measuring the return power level;
    e) determining that the return power level has increased, and applying a change to a diversity parameter of the mobile transmit diversity algorithm based on the results of the re-measuring step; and
    f) determining that the return power level is equal to or greater than a second threshold, repeating steps c-e until the return power level is less than the second threshold.

2. The method of claim 1, further including the step of obtaining the first threshold from a lookup table.

3. The method of claim 1, further including the step of calculating the first threshold.

4. The method of claim 3, wherein the first threshold equals a loaded return loss minus an unloaded return loss plus a margin.

5. The method of claim 1, wherein the reflection-based beamforming technique includes the step of modifying a beam pattern requirement of the modifiable communication device with return loss sampling information to create the adaptive beam shaping pattern.

6. The method of claim 1, further including the step of skipping phase diversity parameters in a gradient-seeking mobile transmit diversity algorithm that result in return loss increases.

7. The method of claim 6, wherein if a phase continuity constraint is mandated for the modifiable mobile communication device, a resolution in the changes to the phase diversity parameter can be minimized by further including the step of reducing transmitted power by an amount of power exceeding specific absorption rate levels at a current frequency and diversity value.

8. A method comprising the steps of:
    a) measuring a return power level present at antennas of a modifiable mobile communication device at regular time intervals;
    b) determining that an output power of the modifiable mobile communication device is greater than a predefined specific absorption rate level, and comparing the return power level to a first threshold;
    c) determining that the return power level is greater than the first threshold, implementing a mobile transmit diversity algorithm combined with reflection-based beamforming, the reflection-based beamforming providing an adaptive beam shaping pattern that shapes a transmitted beam pattern to minimize an amount of reflected transmitted power;
    d) re-measuring the return power level;
    e) determining that the return power level has increased, and reducing the output power of the modifiable mobile communication device; and
    f) determining that the return power level is less than a second threshold, repeating steps a-b, until the output power of the modifiable mobile communication device is less than or equal to the predefined specific absorption rate level.

9. The method of claim 8, further including the step of obtaining the first threshold from a lookup table.

10. The method of claim 8, further including the step of calculating the first threshold.

11. The method of claim 10, wherein the first threshold equals a loaded return loss minus an unloaded return loss plus a margin.

12. The method of claim 8, wherein the reflection-based beamforming includes the step of modifying a beam pattern requirement of the modifiable communication device with return loss sampling information to create the adaptive beam shaping pattern.

13. A method comprising the steps of:
   a) measuring a return power level present at antennas of a modifiable mobile communication device at regular time intervals;
   b) determining that an output power of the modifiable mobile communication device is less than or equal to a predefined specific absorption rate level, implementing mobile transmit diversity;
   c) repeating steps a-c, until the output power of the modifiable mobile communication device is greater than a predefined specific absorption rate level;
   d) determining that the return power level is greater than a first threshold, implementing a mobile transmit diversity algorithm combined with a reflection-based beamforming technique, the reflection-based beamforming technique providing an adaptive beam shaping pattern that shapes a transmitted beam pattern to minimize an amount of reflected transmitted power;
   e) re-measuring the return power level;
   f) determining that the return power level has increased, and applying a change to a diversity parameter of the mobile transmit diversity algorithm based on the results of the re-measuring step; and
   g) determining that the return power level is less than a second threshold, and repeating steps a-b.

14. A method comprising the steps of:
   a) measuring a return power level present at antennas of a modifiable mobile communication device at regular time intervals;
   b) determining that an output power of the modifiable mobile communication device is not greater than a predefined specific absorption rate level;
   c) implementing mobile transmit diversity; and
   d) repeating steps a-c, until the output power of the modifiable mobile communication device is greater than a predefined specific absorption rate level;
   e) determining that the return power level is greater than a first threshold, implementing a mobile transmit diversity algorithm combined with reflection-based beamforming, the reflection-based beamforming providing an adaptive beam shaping pattern that shapes a transmitted beam pattern to minimize an amount of reflected transmitted power;
   f) re-measuring the return power level;
   g) determining that the return power level has increased, and reducing the output power of the modifiable mobile communication device; and
   h) determining that the return power level is equal to or greater than a second threshold, and repeating steps e-g, until the return power level is less than the second threshold.

\* \* \* \* \*